Patented May 28, 1929.

1,715,052

UNITED STATES PATENT OFFICE.

ROGER ADAMS, OF URBANA, ILLINOIS, ASSIGNOR TO ABBOTT LABORATORIES, OF NORTH CHICAGO, ILLINOIS, A CORPORATION OF ILLINOIS.

CYCLOPENTYL COMPOUND AND PROCESS OF MAKING SAME.

No Drawing.   Application filed January 27, 1928.   Serial No. 250,075.

My invention relates to the preparation of acids and their derivatives, having the following general structure:

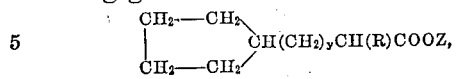

wherein "y" is zero or more and where "R" represents an aliphatic hydrocarbon group, for example, alkyl or alkylene; and "Z" represents hydrogen, a metal, or a hydrocarbon group such as an alkyl or an alkylene.

It has now been found that these acids, especially those containing from 14 to 20 atoms of carbon in the molecule, are strongly bactericidal against acid-fast bacteria, such as $B.\ leprae$ or $B.\ tuberculosis$.

These acids may conveniently be prepared by condensation of a cyclopentyl halide or a cyclopentyl alkyl halide with the proper substituted malonic ester, or by condensation of an omega-cyclopentyl alkyl malonic ester, or a cyclopentyl malonic ester with an alkyl halide, followed by saponification and elimination of carbon dioxide. These reactions are indicated by the following series of equations:—

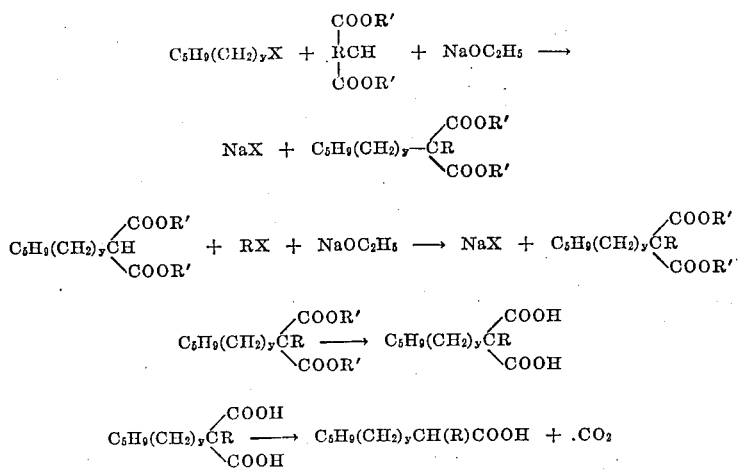

In the above equations, X represents a halogen, "y" represents zero or more, R represents an aliphatic hydrocarbon radical such as alkyl or alkylene, and R' represents an alkyl group.

Without limiting the invention to any particular procedure, the following examples will be illustrative of a general method which may be employed for carrying out the invention:

One molecular equivalent of cyclopentyl bromide or of bromo-alkyl-cyclopentane, as the case may be, is added to a mixture of one molecular equivalent of an alkyl substituted dialkyl malonate and one molecular equivalent of sodium ethylate, and the mixture is refluxed in absolute alcohol until neutral. The alcohol is distilled off, water is added, and the cyclopentyl-alkyl malonic ester or the cyclopentylalkyl-alkyl malonic ester, as the case may be, is separated and purified.

The malonic ester derivative thus obtained is treated with alcoholic potassium or sodium hydroxide solution containing four molecular equivalents of potassium or sodium hydroxide; the mixture is refluxed for one or two hours. Upon evaporation of the alcohol, addition of water, then acidification with a mineral acid, the malonic acid separates and is readily purified.

The malonic acid thus produced is heated above its melting point and held at that temperature until no more evolution of carbon dioxide takes place. The resulting product is then distilled in vacuo.

By this general procedure, the following acids were prepared:

*Example I.*

Alpha — Cyclopentyl alpha-alkyl acetic acids.

General formula: $C_5H_9CH(R)COOH$.

| Where R is— | Physical constants of acid. |
|---|---|
| $C_8H_{17}$ | Boiling point, 165° C. at 1 mm. |
| $C_9H_{19}$ | Boiling point, 177° C. at 1.4 mm. Melting point, 40-42° C. |
| $C_{10}H_{21}$ | Boiling point, 176° C. at 1.5 mm. Melting point, 37° C. |
| $C_{11}H_{23}$ | Boiling point, 175° at 1.2 mm. Melting point, 48° C. |

*Example II.*

Omega — Cyclopentylethylalkyl acetic acids.

General formula:
$C_5H_9CH_2CH_2CH(R)COOH$.

| Where R is— | Boiling points of acid. |
|---|---|
| $C_3H_7$ | 130-132° C. at 2 mm. |
| $C_4H_9$ | 135-137° C. at 1 mm. |
| $C_7H_{15}$ | 152-154° C. at 2 mm. |
| $C_8H_{17}$ | 173-175° C. at 1.5 mm. |

The examples given illustrate the general methods of preparation and the properties of some of the compounds obtained. The scope of the patent is limited neither to the processes specifically described, nor to the compounds mentioned. By using a similar process for example, compounds of the formula $C_5H_9(CH_2)_yCH(R)COOH$, in which "y" is greater than 2, may be readily prepared.

The scope of the invention should be determined by reference to the appended claims, said claims being construed as broadly as possible consistent with the state of the art.

I claim as my invention:

1. As new products, acids of the general formula

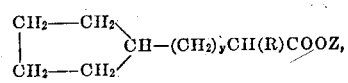

in which "y" represents zero or more, "R" represents an aliphatic hydrocarbon group, and Z represents hydrogen, a metal, or a hydrocarbon group such as an alkyl or an alkylene.

2. The process of making a compound of the type described in claim 1, which includes introducing an alkyl group and a group containing a cyclopentyl radial into a malonic ester, followed by saponification and elimination of one mol of carbon dioxide.

Jan. 24, 1928.

ROGER ADAMS.